United States Patent [19]

Haden, Jr. et al.

[11] 3,932,268

[45] *Jan. 13, 1976

[54] HYDROCARBON CONVERSION PROCESS

[75] Inventors: Walter L. Haden, Jr., Westfield; Frank J. Dzierzanowski, Somerset, both of N.J.

[73] Assignee: Engelhard Minerals & Chemicals Corporation, Menlo Park, Edison, N.J.

[ * ] Notice: The portion of the term of this patent subsequent to Apr. 14, 1987, has been disclaimed.

[22] Filed: Nov. 16, 1971

[21] Appl. No.: 199,305

Related U.S. Application Data

[63] Continuation-in-part of Ser. Nos. 810,325, March 25, 1969, Pat. No. 3,647,718, Ser. No. 856,458, Sept. 9, 1969, Pat. No. 3,657,154, and Ser. No. 10,005, Feb. 9, 1970, Pat. No. 3,663,165, each is a continuation-in-part of Ser. No. 738,384, June 20, 1968, Pat. No. 3,506,594.

[52] U.S. Cl. ............... 208/120; 252/455 Z
[51] Int. Cl.² ......................... C10G 11/04
[58] Field of Search ..................... 208/120

[56] References Cited
UNITED STATES PATENTS

| | | | |
|---|---|---|---|
| 3,210,267 | 10/1965 | Plank et al. | 208/120 |
| 3,325,398 | 6/1967 | Ashwill et al. | 208/120 |
| 3,338,672 | 8/1967 | Haden et al. | 23/112 |
| 3,458,454 | 7/1969 | Lapides et al. | 252/455 |

*Primary Examiner*—Delbert E. Gantz
*Assistant Examiner*—G. E. Schmitkons
*Attorney, Agent, or Firm*—Melvin C. Flint; Inez L. Mosell

[57] ABSTRACT

A process for the catalytic cracking of hydrocarbons to produce gasoline wherein the hydrocarbon charge is contacted under fluid cracking conditions with a fluid catalyst composition comprising ion-exchanged synthetic crystalline faujasite and an amorphous alumina-silica residue of caustic leached calcined kaolin clay which had undergone the kaolin exotherm during calcination, the catalyst particles analyzing, on a volatile-free weight basis, at least 90 percent combined $SiO_2$ and $Al_2O_3$ in a $SiO_2/Al_2O_3$ molar ratio within the range of 0.8 to 1.4/1 and less than 3 percent $Na_2O$.

2 Claims, No Drawings

HYDROCARBON CONVERSION PROCESS

RELATED APPLICATIONS

This application is a continuation-in-part of the following copending applications of W. L. Haden, Jr. and F. J. Dzierzanowski: Ser. No. 810,325, filed Mar. 25, 1969, now U.S. Pat. No. 3,647,718; Ser. No. 856,458, filed Sept. 9, 1969, now U.S. Pat. No. 3,657,154; Ser. No. 10,005, filed Feb. 9, 1970, now U.S. Pat. No. 3,663,165.

This application and all of the forementioned copending applications are continuations-in-part of application Ser. No. 738,384, filed June 20, 1968 and issued as U.S. Pat. No. 3,506,594 on Apr. 14, 1970.

BACKGROUND OF THE INVENTION

Fluid catalytic cracking processes for producing gasoline from gas-oil feedstocks are conventionally carried out as pressures within the range of 8 to 20 p.s.i.g. at 850° to 950°F. Catalyst to oil ratios are generally within the range of 8 to 18 (weight basis). The catalysts for such cracking processes are frequently supplied in the form of very small essentially spherical particles predominantly within the range of 100/325 mesh (Tyler). These particles are usually called "microspheres." The microspheres must possess certain properties among which is hardness, especially resistance to attrition. The particles must also possess adequate activity and selectivity as well as thermal and steam stability.

Highly active and selective cracking catalysts have been prepared by incorporating finely divided crystals of certain crystalline zeolitic aluminosilicates of the molecular sieve type with suitable matrix material such as clay or silica-alumina gels. Ion-exchange synthetic faujasite (zeolite X or zeolite Y) is a suitable crystalline zeolite.

Faujasite may be synthesized from dilute high purity sources of $Na_2O$, $Al_2O_3$ and $SiO_2$. It may also be synthesized by reacting sodium hydroxide solution with calcined kaolin clay. However, in order to obtain faujasite, rather than other zeolitic molecular sieves, the clay must be calcined at relatively high temperature and undergo the characteristic kaolin exotherm. The incorporation of small amounts of kaolin clay calcined at lower temperature ("metakaolin") may aid in the crystallization of the faujasite but, when used as the sole source of silica and alumina, does not result in the crystallization of faujasite.

Microspherical zeolitic cracking catalyst particles have been obtained by forming a slurry of previously formed powdered zeolite crystal with dilute silica hydrosol or alumina-silica hydrosol and spray drying the slurry. Catalyst particles obtained by such processing are expensive since expensive high purity materials are required to prepare the zeolite and a separate binding step is required. The attrition resistance of the products obtained by binding sieve crystals generally leaves something to be desired.

Attempts have also been made to form zeolitic molecular sieve compositions from preformed bodies of essentially the same size and shape as the finished catalyst particles. This has been successfully accomplished by extruding a mixture of caustic solution and clay material, part of which is anhydrous and calcined, and part of which is hydrated. The extruded pellets, generally in the shape of cylinders, are subjected to hydrothermal treatment without dehydration. Faujasite crystallizes in situ in the presence of hydrated kaolin clay as a result of the reaction between the caustic and the calcined clay in the pellets. A feature of the process is that reaction and crystallization are carried out in the absence of an external aqueous phase in contact with the pellets. Thus, there is no extraction of constituents of the pellets. The catalyst product obtained by ion-exchanging and activating the crystallized product has a $SiO_2/Al_2O_3$ mole ratio of about 2/1 — i.e., especially the same ratio that is present in kaolin clay.

Great difficulty has been experienced in preparing crystalline zeolitic molecular sieve composite catalysts in the form of microspheres by the in situ process above described. Problems have been encountered in obtaining discrete microspheres and in crystallizing faujasite from preformed particles containing caustic solution and a mixture of calcined kaolin clay and hydrated kaolin clay. Especial difficulty has been encountered in obtaining small spherical particles of desired resistance to attrition. One reason for the difficulties is that when faujasite is crystallized in situ in the presence of hydrated kaolin in microspherical preforms the small spheres tend to agglomerate and stick to each other during reaction and crystallization. On the other hand, impregnation of caustic solution into preformed microspheres composed of the mixture of hydrated and calcined clay tends to result in the mechanical breakdown of the preforms unless great care is exercised. When caustic is included in the feed to the spray dryer so that it is present in the preformed microspheres, part of the caustic tends to react with combustion gases in the spray dryer and difficulty may be experienced crystallizing the zeolite.

THE INVENTION

An object of the invention is to provide a process for cracking gas-oil feedstock to produce gasoline.

Briefly stated, in accordance with this invention, a hydrocarbon charge is catalytically cracked by contacting the charge under conventional fluid catalytic cracking conditions with a cracking catalyst in the form of small essentially spherical, attrition-resistant particles composed of a mixture of ion-exchanged synthetic crystalline faujasite and an amorphous porous silica-alumina obtained as an alkali-leached residue of calcined kaolin clay, the calcined clay having been obtained by calcining hydrated kaolin clay under conditions of temperature and time such that the clay underwent the characteristic kaolin exotherm.

The catalyst, after thermal activation, is used to crack gas-oil feedstock to produce gasoline. The product possesses high selectivity towards gasoline with low coke production and it operates at a high level of activity. It has outstanding resistance to deterioration by high temperature steam.

The microspherical catalyst may be prepared, in accordance with the invention described and claimed in U.S. Pat. No. 3,506,594, by mixing hydrated kaolin clay (or a mixture of hydrated and calcined clay) in water, spray drying the mixture to form microspheres, calcining the microspheres to dehydrate the hydrated kaolin clay at a temperature (e.g., 1600° to 2200°F.) and for a time such that clay material in the microspheres undergoes or passes through the characteristic kaolin exotherm. As a result of calcination under such conditions, essentially all of the clay is dehydrated and put into a state or condition such that a portion of it will react with sodium hydroxide solution to form crystalline faujasite. Moreover, the microspheres become remarkably attrition-resistant as a result of the high temperature heat treatment, and certain difficulties encountered in crystallizing the faujasite from preformed microspheres containing hydrated clay are obviated. The calcined silica-alumina microspheres are suspended in an aqueous solution of an alkali metal hydroxide, especially sodium hydroxide and, while the aqueous suspension is agitated, it is heated mildly and then heated at more elevated temperature until hydrated sodium faujasite crystals form in the microspheres as a result of reaction between the aqueous reaction liquid and alumina and silica in the microspheres. During the hydrothermal treatment an appreciable amount of silica is leached from the microspheres, forming a sodium silicate mother liquid from which the crystallized microspheres are separated. After separation from the mother liquid, the microspheres are ion-exchanged to reduce the alkali-metal content. Ammonium ions, magnesium ions, rare earth ions and mixtures are examples of suitable exchanging cations. Before or during use the microsheres are activated by heat treatment.

The catalyst may also be prepared in accordance with the procedures described and claimed in Ser. Nos. 810,325 and 10,005 (supra). These procedures are modifications of the general process of U.S. Pat. No. 3,506,594 wherein a small amount of metakaolin is incorporated into the reaction mixture along with the calcined microspheres of kaolin which underwent the exotherm and sodium hydroxide solution. In Ser. No. 810,325, the metakaolin is present in the form of microspheres separate from the microspheres which underwent the exotherm. In Ser. No. 10,005, the metakaolin is present as a powder.

DETAILED DESCRIPTION

Catalyst particles employed in carrying out the present invention analyze at least 90 percent by weight combined $SiO_2$ plus $Al_2O_3$ (on a volatile-free or V.F. weight basis), the $SiO_2/Al_2O_3$ molar ratio in the particles being about 1/1, e.g., 0.8 to 1.4/1. Typical $Al_2O_3$ and $SiO_2$ analyses are, respectively, within the range of 50 percent to 65 percent by weight and 30 percent to 50 percent by weight (V.F. basis). (Volatile-free weight represents the weight of a material remaining after such material has been heated to essentially constant weight at 1800°F.) The particles are readily distinguishable from other catalysts, including zeolitic catalysts, by the fact that the $Al_2O_3$ content and the $Al_2O_3/SiO_2$ ratio are unusually high. Other zeolitic catalysts usually contain appreciably less than 50 percent $Al_2O_3$ and have appreciably lower $Al_2O_3/SiO_2$ ratios. The particles of out catalysts may contain $Na_2O$ in amount up to 10 percent by weight (V.F. basis), generally less than 3 percent $Na_2O$ and, most preferably less than 1 percent $Na_2O$. They may also contain traces of amorphous or crystalline impurities normally associated with high purity kaolin clay, e.g., titanium dioxide. When the catalyst product is obtained by using ammonium ions as the sole exchanging ions, the activated catalyst will be composed essentially of silica, alumina and small amounts of sodium oxide. When nonvolatile cations such as magnesium ions or rare earth ions were used to ion-exchange the sodium form catalyst intermediate, the particles may contain the oxide of such metal(s) in amount up to about 10 percent by weight (V.F. basis).

The zeolitic constituent of the catalyst is faujasite (zeolite X or zeolite Y) and may be present in the catalyst particles in amount within the range of from 1 percent to 70 percent (as determined by X-ray diffraction). Generally from 10 percent to 50 percent is preferred. Preferably, the faujasite is zeolite Y having a $SiO_2/Al_2O_3$ mole ratio above 4.0 (as determined by X-ray diffraction). All X-ray diffraction data mentioned herein refer to values obtained by the procedure and with the equipment described in U.S. Pat. No. 3,391,994 to Haden et al. Faujasite is generally the sole crystalline material that is present in an X-ray diffraction pattern of the product. In some cases small amounts of so-called "zeolite B" may be present. The latter zeolite is described in U.S. Pat. No. 3,008,803.

The nonzeolite portion of the catalyst is a porous amorphous alumina-enriched silica-alumina residue of caustic leached calcined kaolin clay. Such residue has a lower $SiO_2/Al_2O_3$ mole ratio than either faujasite or kaolin clay, as evidenced by the fact that the particles include a zeolite which has a higher $SiO_2/Al_2O_3$ mole ratio than kaolin clay but have an overall $SiO_2/Al_2O_3$ ratio that is a fraction of that of kaolin clay.

Representative catalyst products are composed of particles preponderantly within the range of 100 to 325 mesh (Tyler). Such particles have a pore volume of about 0.5 cc./gm. and a bulk density within the range of 0.7 to 1.0 g./cc. (activated form of the catalyst). The particles have outstanding resistance to attrition when tested by various test procedures which measure the hardness of particles under conditions of attrition simulating those encountered in fluid cracking processes.

The particles may be supplied with the ion-exchanged zeolite component in the hydrated condition in which it was synthesized. Alternatively, the particles may be supplied with the faujasite in dehydrated (activated) form.

The catalyst particles are adapted for use in fluid bed processes for cracking conventional gas-oil feedstocks to produce gasoline. The catalyst has outstanding activity and is highly selective to the production of gasoline when used under conventional cracking conditions. The catalyst is unusually resistant to high temperature steam and is highly active and selective even after being subjected to steam treatments which would impair the activity and/or selectivity of other zeolitic catalysts. As a result of the fact that the catalyst particles are unusually attrition-resistant, catalyst losses during use and regeneration are reduced.

This example illustrates the process of the invention.

A fluid cracking catalyst was produced as follows.

A fine size fraction of high purity hydrated Georgia kaolin clay ("HT") was formed into a 62.5 percent solids deflocculated aqueous slip by agitating the clay in water in the presence of tetrasodium pyrophosphate in amount of 0.30 percent of the clay weight. The slip was spray dried to produce microspheres in a 5 × 5 ft. gas-fired spray dryer using an atomizer speed of 16,760 r.p.m. Air inlet and outlet temperatures were approximately 1100° and 450°F., respectively. A minus 60 mesh (Tyler) fraction of microspheres was recovered by screening. The microspheres were calcined in a continuous rotary calciner of the type described in Allegrini et al. patent U.S. Pat. No. 3,383,438. The air inlet temperature during calcination was in the range of 2150° to 2250°F. After the microspheres had cooled, a 2299 lb. was blended with 121 lb. of a commercial metakaolin pigment ("Satintone No. 2"). The mixture was gradually added to 3865 lb. of a 15.0 percent (w/w) aqueous solution of sodium hydroxide in a 500 gallon reactor. The ingredients were mixed and aged at 100°F. for 12 hours and then maintained at about 180°F. for 16 hours. During aging and crystallization, the reactor was covered with a loosely fitting cover. Agitation was intermittent during aging and crystallization. After the reacted mixture had cooled, it was centrifuged to remove mother liquor and suspended fine particles.

The residue from the centrifuge was repulped in water and again centrifuged. This product contained 26 percent zeolite Y having a $SiO_2/Al_2O_3$ of 4.62. A portion of the residue from the centrifuge was exchanged batchwise with 2N $NH_4NO_3$ to a sodium oxide content of 1.14 percent. The exchanged product was water washed and air dried at room temperature.

The bulk density of a 200/270 mesh fraction of the sample (after being calcined at 1100°F.) was 0.926 g./cc.

The dried product had an L.O.I. (loss on ignition at 1800°F.) of 24.74 percent and a chemical analysis as follows:

|  | Wt. % (V.F.* Basis) |
|---|---|
| $Na_2O$ | 1.14 |
| $Al_2O_3$ | 56.03 |
| $SiO_2$ | 40.07 |
| $Fe_2O_3$ | 0.38 |
| $TiO_2$ | 2.29 |

*V.F. = volatile free weight basis, determined by heating material to essentially constant weight at 1800°F.

Hardness by the "Wig-L-Bug" test (described in U.S. Pat. No. 3,506,594) was 0.50 percent/sec. A comparison of this value with those of commercially available fluid cracking catalysts shows that the catalyst of the invention had outstanding resistance to attrition.

A sample of dried ion-exchange microspheres was pelletized with "Sterotex" binder and the pellets were activated by heating at 1350°F. for 4 hours in an atmosphere of 100 percent steam. Catalytic properties were tested by the "Cat-D" procedure at a liquid hourly space velocity (LHSV) of 3.0.

To test the thermal stability, a portion of the steamed catalyst was calcined at 1500°F. for 4 hours in 100 percent steam and then tested by the Cat-D method. Results are summarized in table form.

| CATALYTIC PROPERTIES OF ZEOLITIC CRACKING CATALYST | | |
|---|---|---|
| Heat Treatment (steam) | 1350°F./4 hr. | 1500°F./4 hr. |
| Gasoline, Vol. % | 53.8 | 61.1 |
| Coke, Wt. % | 8.62 | 2.66 |
| Gas, Wt. % | 30.1 | 15.2 |
| Gas Gravity | 1.66 | 1.58 |
| Conversion, Wt. % | 84.0 | 68.7 |

Data in the table show that the catalyst had outstanding selectivity towards gasoline, low coking properties and excellent stability towards high temperature steam.

We claim:

1. A method for cracking a hydrocarbon charge which comprises contacting said charge under fluid catalytic cracking conditions with a cracking catalyst in the form of attrition-resistant microspheres consisting essentially of a mixture of ion-exchanged synthetic faujasite and an amorphous alumina-silica residue of caustic leached calcined kaolin clay, said mixture having been obtained when the sodium form of faujasite was crystallized in situ by hydrothermal treatment of a suspension of amorphous silica-alumina microspheres comprising calcined clay in a dilute sodium hydroxide solution, said calcined clay having undergone the kaolin exotherm during calcination, said cracking catalyst microspheres analyzing, on a volatile-free weight basis, at least 90 percent combined $SiO_2$ and $Al_2O_3$ in a $SiO_2/Al_2O_3$ molar ratio within the range of 0.8 to 1.4/1 and less than 3 percent $Na_2O$.

2. The method of claim 1 wherein the cracking process is carried out at a temperature within the range of 850° to 950°F. at a pressure within the range of 8 to 20 p.s.i.g.

* * * * *